United States Patent [19]

Stringer

[11] Patent Number: 4,819,987
[45] Date of Patent: Apr. 11, 1989

[54] AIRCRAFT SEAT LEG SUPPORT RELEASE DEVICE

[75] Inventor: Calvin R. Stringer, Saugus, Calif.
[73] Assignee: Weber Aircraft, Burbank, Calif.
[21] Appl. No.: 122,101
[22] Filed: Nov. 18, 1987
[51] Int. Cl.⁴ .................................................. A47C 7/50
[52] U.S. Cl. ...................................... 297/434; 297/436
[58] Field of Search ............................... 297/431–436, 297/429

[56] References Cited

U.S. PATENT DOCUMENTS

| | | | |
|---|---|---|---|
| 2,559,127 | 7/1951 | Lyon | 297/434 |
| 2,918,964 | 12/1959 | Braun | 297/434 |
| 4,509,795 | 4/1985 | Brennan et al. | 297/434 |
| 4,635,999 | 1/1987 | Simpson | 297/434 |

Primary Examiner—Francis K. Zugel
Attorney, Agent, or Firm—Lyon & Lyon

[57] ABSTRACT

An extendable footrest or legrest for a passenger seat or the like including a pressure relief system which permits retraction of the footrest upon the application of a predetermined load. The footrest is supported by a hydraulic actuator that is supported by springs that are compressed by the predetermined load to activate the actuator and allow retraction of the footrest.

22 Claims, 2 Drawing Sheets

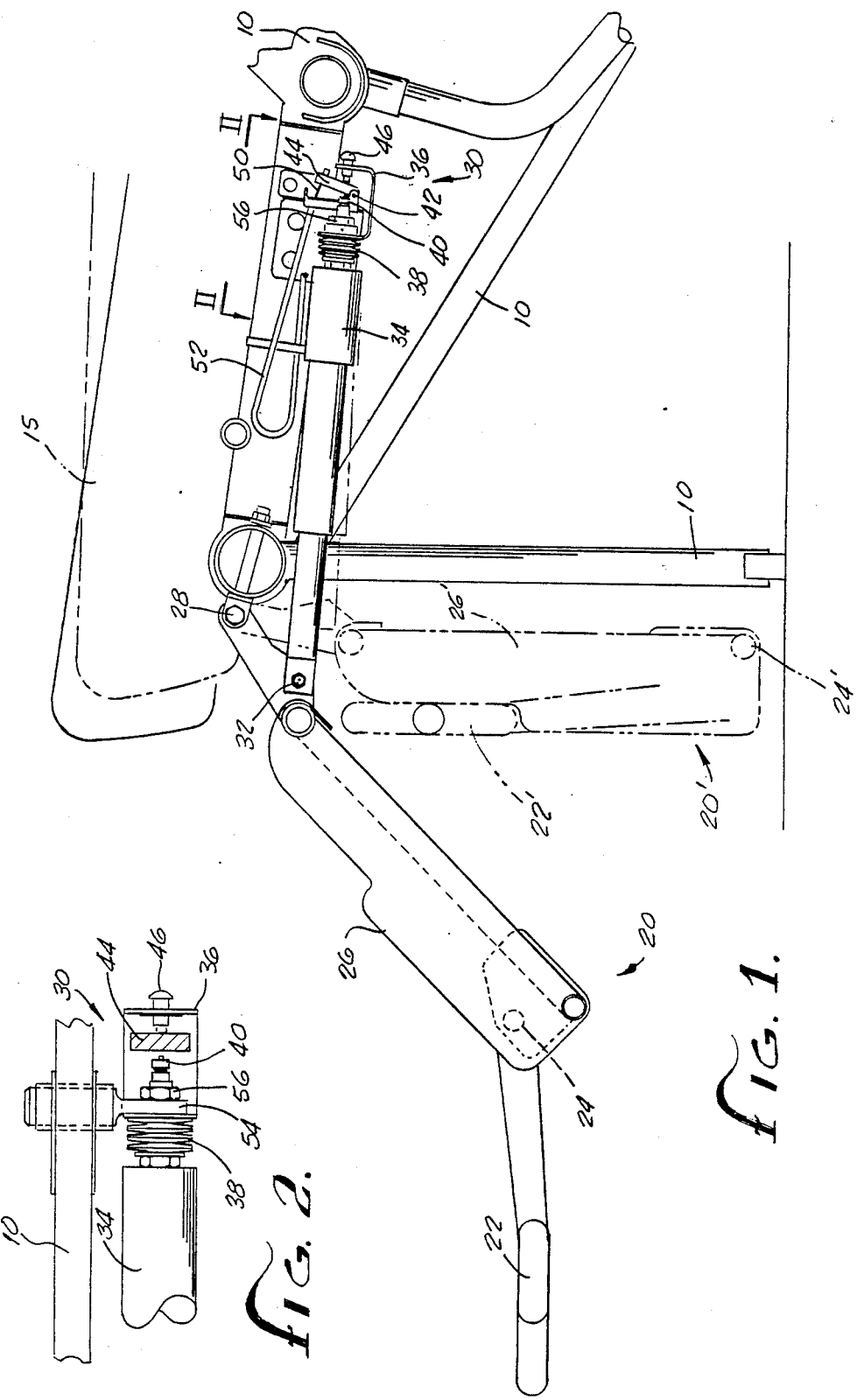

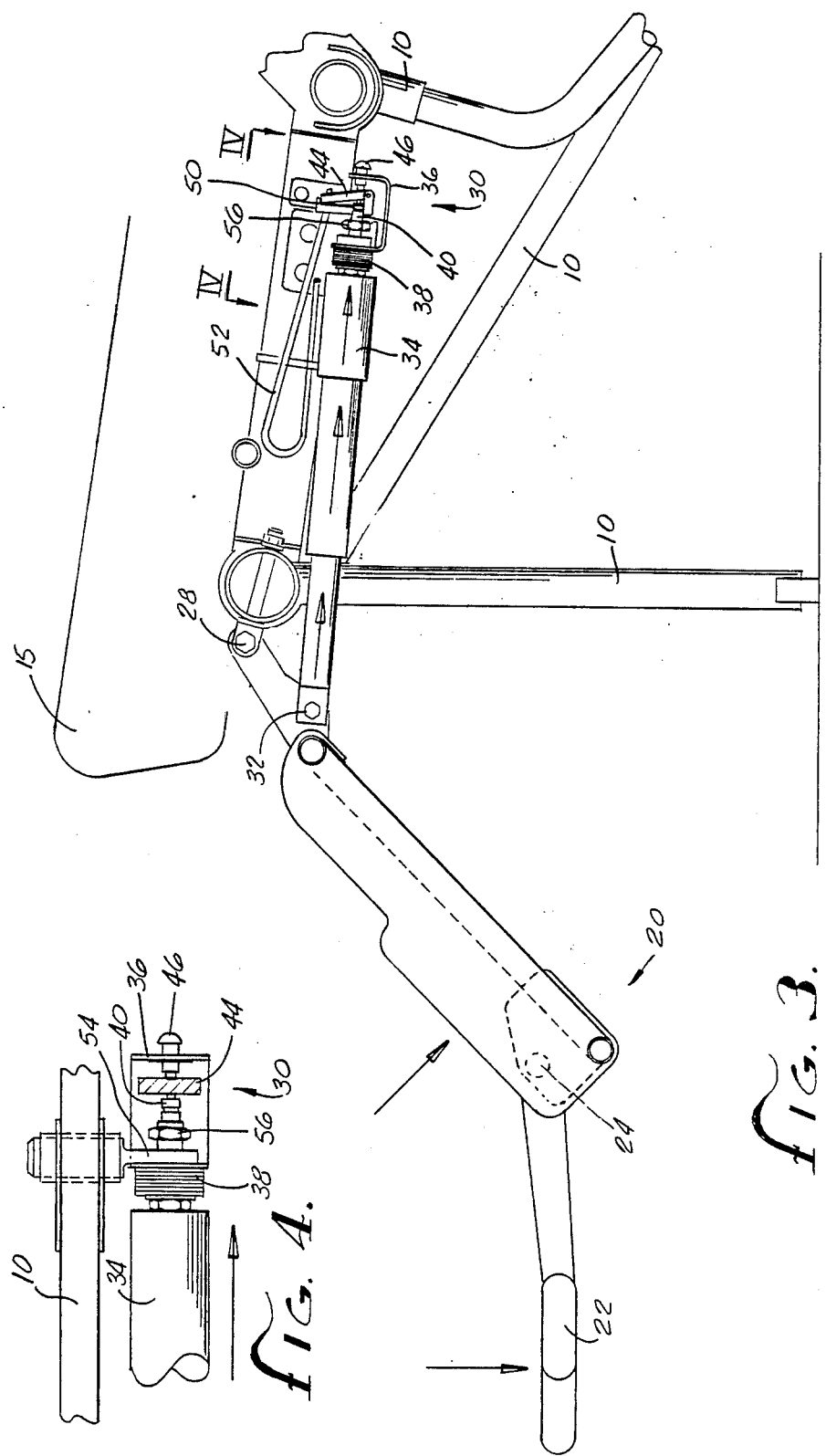

AIRCRAFT SEAT LEG SUPPORT RELEASE DEVICE

BACKGROUND OF THE INVENTION

The field of the present invention is footrests or legrests installed on passenger seats or the like.

Many passenger seats such as those on passenger aircraft or trains have installed thereon an extendable footrest or legrest for the reclining comfort of the passenger. Typically the footrest is actuated by a controller located on the seat armrest via a mechanical cable running from the controller to the footrest. When actuated, the footrest extends from its stowed, retracted position to the extended, in use position. To return to its stowed position, the controller is actuated while pushing the footrest back to its retracted position.

One limitation of the typical footrest is that the footrest controller needs to be actuated in order to permit retraction of the footrest. If the passenger is unaware that the actuator must be operated in order to retract the footrest, there is an emergency situation, or the actuator itself fails, the passenger may attempt to forceably retract the footrest without activating the release mechanism. Such a situation may either damage the footrest or hamper the movement of the passenger.

There exist certain hydraulic actuated footrests equipped with a hydraulic controller which will retract upon application of an excessive load. Once forceably retracted, however, the hydraulic controller does not return to its extended position when the controller is actuated. The footrest must then be forced to its extended position in order to reset the hydraulic controller. The typical passenger or airline attendant may not have the knowledge or the strength to reset the footrest so the resetting is usually performed by maintenance personnel during turnover of the aircraft.

SUMMARY OF THE INVENTION

The present invention is directed to a footrest or legrest which may be installed on a passenger seat. The footrest includes a pressure release device which permits retraction of the footrest upon application of a predetermined force.

BRIEF DESCRIPTION OF THE DRAWINGS

FIG. 1 diagrammatically illustrates a side view of a passenger seat and footrest according to the present invention;

FIG. 2 is a detailed plan view of a portion of the pressure release system shown in FIG. 1 according to the present invention;

FIG. 3 diagrammatically illustrates a side view of a passenger seat and footrest according to the present invention with the footrest in the extended position and illustrating a force applied to the footrest; and FIG. 4 is a detailed plan view similar to FIG. 2 of the pressure release system in the compressed condition as shown in FIG. 3.

DETAILED DESCRIPTION OF THE PREFERRED EMBODIMENT

A preferred embodiment will now be described with reference to the drawings. Any element identified by a numeral in one figure will represent the same element in any other figure. FIG. 1 illustrates an aircraft passenger seat 15 attached to a frame 10. For the convenience of description, a front end or forward direction and a rear end or backward direction are defined relative to the perspective of a person sitting normally in passenger seat 15. On the underside of the seat 15 is an extendable footrest 20 pivotally attached to frame 10. The footrest 20 is comprised of an outwardly extending leg portion 26 (the extendable member) which is pivotally connected to the frame 10 at a connector 28. A footbar 22 may be pivotally connected to the front end of the leg portion of 26 at the connector 24 to provide further passenger comfort. FIG. 1 illustrates a footrest 20 in the extended position with a normal load or no load applied thereon.

The legrest 20 is extended by an actuation assembly 30 which is attached to the frame 10. FIG. 2 is a detailed view of a portion of the actuation assembly 30 of FIG. 1. The actuation assembly 30 is attached to the footrest 20 at a connector 32. The footrest 20 is extended by the expansion of the actuation assembly 30.

Though many types of actuation assemblies are feasible, only a preferred hydraulic assembly will be described. The actuation assembly 30 may include a hydraulic actuator 34 of the type having a piston and cylinder combination with the piston sliding within the cylinder to accomplish expansion of the actuator 34. Hydraulic fluid is transferred between chambers in the piston and in the cylinder through an orifice located therebetween. The opening and closing of the orifice is controlled by a pressure relief pin 40 wherein the hydraulic actuator 34 permits normal expansion and contraction only when the orifice is opened by the operation of the pressure relief pin 40. Typically, the actuator 34 is biased, a biasing means, to an expanding condition by a spring or the like (not shown) such that when the pressure relief pin 40 is actuated, the hydraulic actuator 34 will then expand and extend the footrest 20.

The pressure relief pin 40 is actuated by a controller button (not shown) typically located on the armrest of the passenger seat 15. A control cable 50 within a cable sleeve 52 runs from this controller to the actuation assembly 30. The control cable 50 is connected to a lever 44 which pivots about a pivot point 42, the pivoting motion actuating or releasing the pressure relief pin 40. The footrest 20 is thereby extended by pressing the controller button located on the armrest which pulls the control cable 50 thereby pivoting the lever 44 in a counter clockwise direction as viewed in the figure thereby contacting and depressing the pressure relief pin 40 which opens the orifice within hydraulic actuator 34 allowing the biased expansion of the actuator to extend the footrest 20. Upon release of the controller, the pressure relief pin 40, which is biased to a position closing the orifice, returns to its closed position and lever 44 returns to its resting position. The resting position of pressure relief pin 40 is set by a nut 56 which rests against sleeve 54 as the pressure relief pin 40 slides inside sleeve 54. The resting position of the lever 44 is set by a set screw 46. Set screw 46 is held in position on bracket 36 which is attached to sleeve 54.

FIG. 1 also illustrates by the dotted line the footrest 20' in the stowed position. When the controller is actuated, pressure relief pin 40 opens the orifice and the footrest leg portion 26' may be manually pivoted in opposition to the biasing force of the actuator 34 to position the leg portion 26' under seat 15. Footbar 22' may then be manually folded upward, pivoting about connector 24' and stowed neatly under seat 15 adjacent leg portion 26'.

Actuation assembly 30 also includes a pressure relief system which permits retraction of footrest 20 when a predetermined load is applied on the footrest 20 toward the stowed position without actuating the control button.

The preferred pressure relief system is illustrated in the figures. A spring 38, which may be comprised of a plurality of Belleville washers, is located on the rear end of the actuator 34. FIG. 1 and the detailed view in FIG. 2 illustrate the pressure relief system in the unloaded condition. FIG. 3 and the detailed view in FIG. 4 illustrate the application of an excessive load on footrest 20 toward the stowed position. Upon application of force upon the footrest 20 toward its stowed position, the spring 38 is compressed by longitudinal movement of the entire actuator 34, the end of the actuator 34 including the pressure relief pin 40 slides through the sleeve 54, and then the pin 40 and the lever 44 move toward set screw 46. At a given force, typically chosen to be about 150 lbs., applied to the footrest 20 toward the stowed position, as shown in FIGS. 3 and 4, the lever 44 contacts the set screw 46 and pivots into contact with the pressure relief pin 40 thereby actuating the pressure relief pin 40 and opening the orifice in the hydraulic actuator 34. Once the hydraulic pressure relief pin 40 is actuated, the actuator 34 may contract and the footrest 20 may swing toward its stowed position. The load at which the footrest 20 actuates the pressure relief system 30 may be chosen by selecting the stiffness of the spring 38. Since Belleville washers may have a tendency to stiffen through use and from age, load adjustment may also be made by adjusting the set screw 46 to reposition the resting position of lever 44.

Alternately, the pivoting lever 44 may remain stationary relative to the sliding longitudinal movement of actuator 34 and pressure relief pin 40. In such an embodiment, as force is applied on the footrest 20 toward the stowed position, actuator 34 attempts to contract and moves longitudinally rearward thereby compressing springs 38. As the springs 38 are compressed, the end of actuator 34 including pressure relief pin 40 slides through the sleeve 54 toward the lever 44. Though this embodiment is not illustrated, the resting position of the lever 44 is set by the set screw 46. At a given force applied to the footrest 20 toward the stowed position, the tip of pressure relief pin will slide into contact with the lever 44 causing actuation of the pressure relief pin 40 thereby allowing the actuator 34 to contract.

Thus a footrest or legrest with a pressure release system is disclosed which permits retraction of the legrest upon application of a given force. Though the pressure relief system described has been applied to footrests, many other applications are feasible and contemplated. While embodiments and applications of this invention have been shown and described, it would be apparent to those skilled in the art that many more modifications and applications are possible without departing from the inventive concepts herein. The invention, therefore is not to be restricted except in the spirit of the appended claims.

What is claimed is:

1. A footrest comprising:
   a frame member;
   an extendable member pivotally attached to the frame member and having a stowed position and an extended position;
   a piston and cylinder combination attached to the frame member and to the extendable member and being slidably expandable and contractable as said extendable member pivots, wherein the piston and cylinder combination has an orifice having an open position and a closed position and biased to the closed position such that the piston and cylinder combination may slidably expand and contract when the orifice is in the open position;
   a controller for actuating the orifice to the open position; and
   a pressure relief system comprising a means for actuating the orifice to the open position when a given force is applied on the extendable member toward the stowed position thereby permitting the extendable member to move to the stowed position.

2. A footrest according to claim 1 further comprising a means for biasing the extendable member to the extended position.

3. A footrest according to claim 1 wherein said pressure relief system is operably connected to the orifice and comprises a spring and a means for actuating the orifice to the open position upon compression of the spring, wherein at a given force applied on the extendable member toward the stowed position, the spring is compressed thereby opening the orifice and permitting the extendable member to move to the stowed position.

4. A footrest comprising:
   a frame member;
   an extendable member pivotally attached to the frame member and having a stowed position and an extended position;
   a piston and cylinder combination attached to the frame member and to the extendable member and being slidably expandable and contractible as said extendable member pivots, wherein the piston and cylinder combination has an orifice having an open position and a closed position and biased to the closed position such that the piston and cylinder combination may slidably expand and contract when the orifice is in the open position;
   a controller for actuating the orifice to the open position; and
   a pressure relief system comprising a means for actuating the orifice to the open position when a given force is applied on the extendable member toward the stowed position thereby permitting the extendable member to move to the stowed position,
   wherein said pressure relief system comprises:
   (a) a pressure relief pin operably attached to the orifice,
   (b) a compression spring which is compressed by force applied on the extendable member toward the stowed position, and
   (c) a lever pivoting and actuated by the controller between a first position out of engagement with the pressure relief pin and a second position engaging the pressure relief pin, the lever biased to the first position,
   wherein at the given force applied on the extendable member toward the stowed position, the compression spring is compressed so as to engage the pressure relief pin against the lever thereby opening the orifice and permitting the extendable member to move to the stowed position.

5. A footrest according to claim 4 further comprising a means for adjustably positioning the lever.

6. A footrest according to claim 5 wherein the means for adjustably positioning the lever comprises a set screw.

7. In a footrest for a passenger seat having an extendable member pivotally attached to a frame member, the extendable member having an extended position and a stowed position, a pressure relief system comprising:
an expansion member attached to the frame member and the extendable member and
an actuation means for activating the expansion member, the expansion member being expandable and contractable upon activation of the actuation means,
wherein at a given force applied on the extendable member toward the stowed position, the actuation means is activated thereby permitting the expansion member to contract and the extendable member to pivot toward the stowed position.

8. A pressure relief system for a footrest according to claim 7 further comprising a means for biasing the extendable member to the extended position.

9. A pressure relief system for a footrest according to claim 7 wherein the expansion member is comprised of a piston and cylinder combination having an orifice with an open position and a closed position such that the piston and cylinder combination may slidably expand and contract when the orifice is in the open position,
wherein the pressure relief system is operably connected to the orifice and comprises a spring and a means for actuating the orifice to the open position upon compression of the spring, wherein at a given force applied on the extendable member toward the stowed position, the spring is compressed thereby opening the orifice and permitting the extendable member to move to the stowed position.

10. In a footrest for a passenger seat having an extendable member pivotally attached to a frame member, the extendable member having an extended position and a stowed position, a pressure relief system comprising:
an expansion member attachable to the frame member and the extendable member and
an actuation means for activating the expansion member, the expansion member being expandable and contractible upon activation of the actuation means,
wherein at a given force applied on the extendable member toward the stowed position, the actuation means is activated thereby permitting the expansion member to contract and the extendable member to pivot toward the stowed position,
wherein the expansion member is comprised of a piston and cylinder combination having an orifice with an open position and a closed position such that the piston and cylinder combination may slidably expand and contract when the orifice is in the open position, and wherein said pressure relief system further comprises:
(a) a pressure relief pin operably attached to the orifice,
(b) a compression spring which is compressed by force applied on the extendable member toward the stowed position, and
(c) a lever pivoting and actuated by a controller between a first position out of engagement with the pressure relief pin and a second position engaging the pressure relief pin, the lever biased to the first position,
wherein at the given force applied on the extendable member toward the closed position, the compression spring is compressed so as to engage the pressure relief pin against the lever thereby opening the orifice and permitting the extendable member to move to the stowed position.

11. A pressure relief system for a footrest according to claim 10 further comprising a means for adjustably positioning the lever.

12. A pressure relief system for a footrest according to claim 11 wherein the means for adjustably positioning the lever comprises a set screw.

13. A pressure relief system for a footrest according to claim 7 wherein the expansion member comprises a hydraulic actuator comprised of a piston and cylinder combination wherein hydraulic fluid is transferable between chambers in the piston and in the cylinder through an orifice located therebetween, the orifice having an open position and a closed position such that the piston and cylinder combination may slidably expand and contract when the orifice is in the open position.

14. A pressure relief system comprising:
a frame member;
an extendable member movably attached to the frame member, the extendable member having an extended position and a retracted position;
an expansion member connected between the frame member and the extendable member; and
an actuation means for actuating the expansion member, the expansion member being expandable and contractable upon actuating the actuation means,
wherein at a given force applied on the extendable member toward the retracted position, the actuation means is activated thereby permitting the expansion member to contract and the extendable member to move toward the retracted position.

15. A pressure relief system according to claim 14 further comprising a means for biasing the extendable member to the extended position.

16. A pressure relief system according to claim 14 wherein the expansion member is comprised of a piston and cylinder combination having an orifice with an open position and a closed position such that the piston and cylinder combination may slidably expand and contract when the orifice is in the open position,
wherein the pressure relief system is operably connected to the orifice and comprises a spring and a means for actuating the orifice to the open position upon compression of the spring, wherein at a given force applied on the extendable member toward the retracted position, the spring is compressed thereby opening the orifice and permitting the extendable member to move to the retracted position.

17. A pressure relief system comprising:
a frame member;
an extendable member pivotally attached to the frame member, the extendable member having an extended position and retracted position;
an expansion member attached to the frame member and the extendable member; and
a means for actuating the expansion member, the expansion member being expandable and contractible upon actuation of actuation means,
wherein at a given force applied on the extendable member toward the retracted position, the actuation means is activated thereby permitting the expansion member to contract and the extendable member to pivot toward the retracted position, wherein the expansion member is comprised of a piston and cylinder combination having an orifice with an open position and a closed position such that the piston and cylinder combination may slidably expand and contract when the orifice is in the open position, and wherein said pressure relief system further comprises:

(a) a pressure relief pin operably attached to the orifice, (b) a compression spring which is compressed by force applied on the extendable member toward the retracted position, and (c) a lever pivoting and actuated by a controller between a first position out of engagement with the pressure relief pin and a second position engaging the pressure relief pin, the lever biased to the first position, wherein at the given force applied on the extendable member toward the closed position, the compression spring is compressed so as to engage the pressure relief pin against the lever thereby opening the orifice and permitting the extendable member to move to the retracted position.

18. A pressure relief system according to claim 17 further comprising a means for adjustably positioning the lever.

19. A pressure relief system according to claim 18 wherein the means for adjustably positioning the lever comprises a set screw.

20. A pressure relief system according to claim 14 wherein the expansion member comprises a hydraulic actuator comprised of a piston and cylinder combination wherein hydraulic fluid is transferrable between chambers in the piston and in the cylinder through an orifice located therebetween, the orifice having an open position and a closed position such that the piston and cylinder combination may slidably expand and contract when the orifice is in the open position.

21. A pressure relief system comprising:

a frame member;

an extendable member pivotally attached to the frame member, the extendable member having an extended position and retracted position;

an expansion member attachable to the frame member and the extendable member; and a means for actuating the expansion member, the expansion member being expandable and contractible upon actuation of actuation means, wherein at a given force applied on the extendable member toward the retracted position, the actuation means is activated thereby permitting the expansion member to contract and activated thereby permitting the expansion member to contract and the extendable member to pivot toward the retracted position, wherein the expansion member is slidably mounted on the frame, wherein the expansion member has a means biasing the expansion member relative to the frame in a direction toward expanding the expansion member, and wherein the given force causes sliding movement of the expansion member relative to the frame in opposition to the biasing means.

22. A pressure relief system according to claim 21 wherein the sliding movement of the expansion member causes activation of the actuation means.

* * * * *

UNITED STATES PATENT AND TRADEMARK OFFICE
CERTIFICATE OF CORRECTION

PATENT NO. :      4,819,987
DATED      :      April 11, 1989
INVENTOR(S) :     Calvin R. Stringer It is certified that error appears in the above-identified patent and that said Letters Patent is hereby corrected as shown below:

In claim 17, line 6 thereof (column 6, line 59) change "attached" to "attachable".

Signed and Sealed this

Twenty-sixth Day of September, 1989

*Attest:*

DONALD J. QUIGG

*Attesting Officer*    Commissioner of Patents and Trademarks